Sept. 7, 1954   J. C. CHRISTENSON   2,688,704
MOTOR AND ENGINE DRIVEN ELECTRIC GENERATING ASSEMBLAGE
Filed May 13, 1953   2 Sheets-Sheet 1
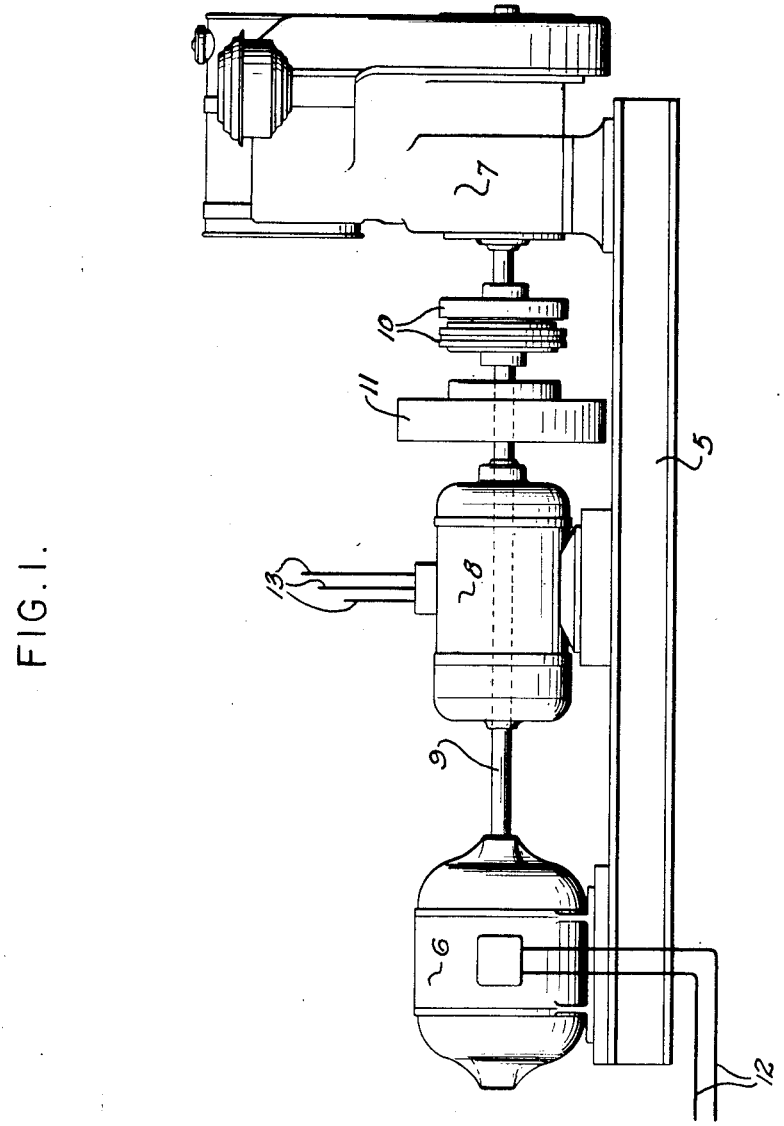
INVENTOR.
John C. Christenson,
BY
Morsell & Morsell
ATTORNEYS

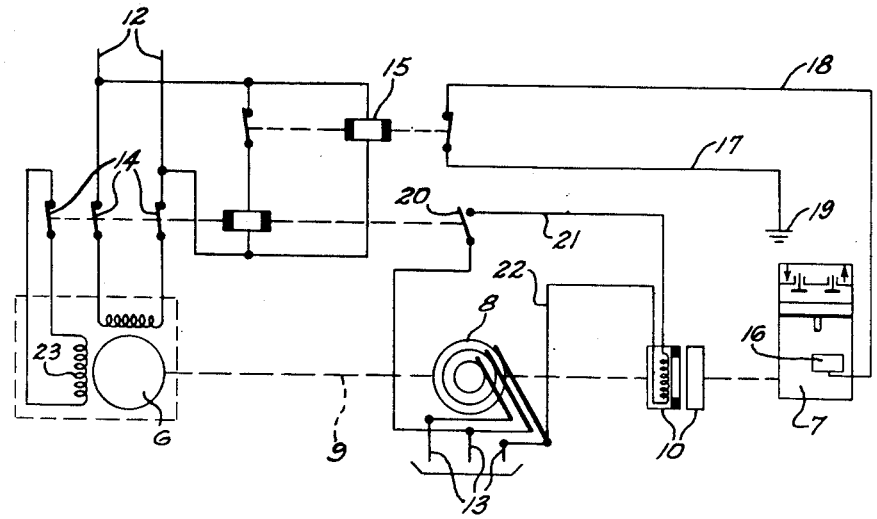
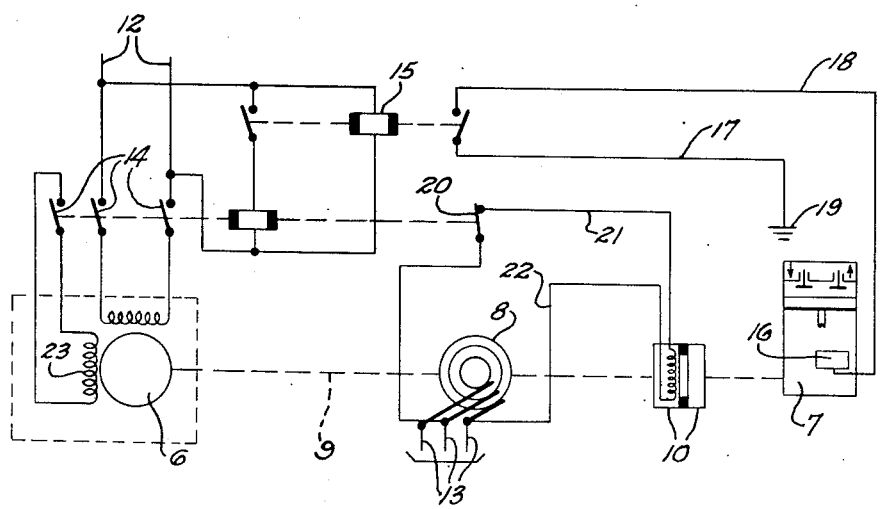

Patented Sept. 7, 1954

2,688,704

UNITED STATES PATENT OFFICE 2,688,704

MOTOR AND ENGINE DRIVEN ELECTRIC GENERATING ASSEMBLAGE

John C. Christenson, Oshkosh, Wis., assignor to United States Motors Corporation, Oshkosh, Wis., a corporation of Wisconsin Application May 13, 1953, Serial No. 354,773

11 Claims. (Cl. 290—4)

This invention relates to improvements in motor and engine driven electric generating assemblages, and more particularly to a motor-generator-engine assemblage so arranged as to provide a constant source of electrical power despite fluctuations and failures in the normal source of commercial electrical power.

A primary object of the invention is to provide a stand-by or auxiliary electric power plant for use in connection with equipment which cannot tolerate any interruptions of electrical power as in various forms of communication systems.

In the conventional installations the electricity normally flows from the source (power lines) to the essential equipment to be energized, such as the equipment of a communication system. To guard against electric power failures it is standard practice to provide stand-by batteries and/or internal combustion combustion engine-generator sets for temporarily supplying electricity to the essential equipment should there be power failure from the source. In using such stand-by equipment as an internal combustion engine operated generator there will always be a substantial time period between the power failure from the source and the flow of electrical power from the stand-by equipment which may hereinafter be referred to as a power "outage." In connection with critical equipment such as communication systems, a power "outage" even for a short period of time is a great disadvantage. The present invention aims at the elimination of any power "outage" whatsoever in situations discussed. In using batteries as stand-by equipment, extremely high installation and maintenance expenses are entailed.

A more specific object of the present invention is to provide a motor and engine driven electric generator set adapted to be interposed between the source of electrical power and the essential equipment to be energized which will maintain the frequency and voltage output at reasonable and usable values during transfer from the electric motor to the internal combustion engine, as a prime mover, and vice-versa, thereby providing a constant source of electrical power to the essential equipment despite power failures from the source.

A further more specific object of the invention is to provide a motor and engine driven electric generating set for interposition between the source of power and the essential equipment to be energized so arranged that on power failure at the source the engine is automatically set into operation to drive the generator and on restoration of power from the source, the engine stops.

A further more specific object of the invention is to provide a motor and engine driven electric generating assemblage interposed between a source of power and essential equipment to be energized which, as long as the power from the source remains at a usable value the generator functions only to stabilize or regulate the voltage to the essential equipment but, upon a power failure from the source and before there is any loss of power to the essential equipment, the internal combustion engine will automatically operate to drive the generator and thereby supply the essential equipment with the proper electricity, maintaining the required voltage without any power "outage" whatsoever.

A further object of the invention is to provide a motor and engine driven electric generating assemblage which is relatively compact, which is completely automatic in its operation, which is strong and durable and efficient and susceptible of regulation and adjustment, and which is well adapted for the purposes described.

With the above and other objects in view the invention consists of the improved motor and engine driven electric generating assemblage, and its parts and combinations as set forth in the claims, and all equivalents thereof.

In the accompanying drawings in which the same reference characters indicate the same parts in all of the views:

Fig. 1 is a side view of the improved motor and engine driven electric generating assemblage;

Fig. 2 is a schematic wiring diagram of the assemblage showing the electric motor as being in operation and the internal combustion engine idle; and Fig. 3 is a similar schematic wiring diagram of the assemblage only showing the generator as being driven by the internal combustion engine as required during a power failure from the source.

In Fig. 1 there is disclosed, merely for purposes of illustration, a convenient manner in which the elements of the assemblage may be associated and mounted. A support or base is designated by the numeral 5 and mounted thereon at one end is an electric motor 6. At the other end of the base 5 there is mounted an internal combustion engine 7 which is capable of driving an electric generator 8 under full load and at a constant speed. The generator 8 is also mounted on the base 5 between the motor 6 and engine 7. It will be observed that an elongated shaft 9 extends horizontally and provides the integral drive shaft of the motor 6, the shaft of the generator 8 and the drive shaft for the internal combustion 7. However, between the generator 8 and the engine 7 said shaft 9 is broken and the adjacent portions thereof carry the complementary members of a conventional electrically influenced magnetic clutch 10. When the complementary parts of said magnetic clutch 10 are engaged, as in Fig. 3, the shaft portions 9 between the engine 7 and generator 8 are joined so that said shaft, then being driven by the internal combustion engine 7, operates the generator 8. However, when the magnetic clutch 10 is disengaged, as in Fig. 2, the internal combustion engine 7 is then separated from the other units of assemblage and is out of operation.

Fast on a portion of the shaft 9 which is always driven during the operation of the motor 6 is a fly wheel 11 of sufficient mass to keep the shaft rotating for a reasonable period and maintain proper generator voltage even after there is a drop in power from the source to the motor 6. Such momentum of the fly wheel 11, as will hereinafter appear, is utilized to start or crank the internal combustion engine 7 when the magnetic clutch 10 becomes engaged.

The power lines from the commercial source to the electric motor 6 are indicated by the numerals 12. The electricity carrying lines from the generator to the essential equipment (not shown) are designated by the numerals 13. It will be appreciated that the essential equipment can be any equipment which requires an uninterrupted flow of electrical power thereto as, for instance, a telephone exchange or a communication system.

For an understanding of the operation of the assemblage under certain conditions reference will first be made to Fig. 2 of the drawings which schematically shows the arrangement when electrical energy is properly flowing from the source. In this event certain contactors or motor starting switches 14 in the main power lines 12 extending to the motor 6 are closed, as are the connected switches of a pilot relay 15 whereby the circuit to the engine magneto 16, through the circuit wires 17 and 18 is grounded as at 19. Under these conditions it will furthermore be observed that, through a solenoid operated switch 20 the circuit to the magnetic clutch 10, through the wires 21 and 22, is broken. Under the conditions depicted in Fig. 2, therefore, the shaft 9 then operated by the electric motor 6 and extending through the generator 8 is being rapidly revolved, turning the fly wheel 11 which is fast on the shaft 9. During this condition the generator 8 functions to provide regulated or stabilized voltage to the essential equipment (not shown) through the wires 13.

Should the voltage from the source flowing through the wires 12 to the motor 6 drop below a predetermined value, then the pilot relay switches 14 will automatically open breaking the circuit to the motor starting coils 23. Simultaneously, a solenoid operated switch 20 will close the circuit to the magnetic clutch 10 (see Fig. 3) thereby engaging the clutch to join the portions of the shaft 9 betwen the generator 8 and the internal combustion engine 7. Notwithstanding possible retardation of the motor 6, sufficient momentum will have remained in the shaft 9 and fly wheel 11 to automatically crank and start the internal combustion engine 7 which then has the circuit to its magneto 16 broken through the opening of the solenoid controlled switch 15 in the circuit of wires 17 and 18. With the internal combustion engine 7 in operation and with the magnetic clutch 10 engaged, as in Fig. 3, power from the operating engine 7 is then transmitted to the generator 8 through the shaft 9 causing the generator to supply electrical energy at the required values to the essential equipment through the wires 13. It may be stated that during the period in which the motor 6 goes out of operation, due to a failure in the power from the source, and the engine 7 comes into operation for driving the generator, there is no appreciable time lag nor power "outage" in respect to the essential equipment being supplied. This is by reason of the fact that the fly wheel 11 was initially revolved by the electric motor and maintains its momentum when the magnetic clutch 10 is engaged to crank the engine 7 which then supplies the power back to the generator through the coupled shaft 9. The electrical frequency and voltage output are maintained at reasonable and usable values during the transfer from the motor 6 to the engine 7 as the prime mover, and vice-versa. Hence there is a constant source of electrical power to the essential equipment notwithstanding failures in the power from the normal source through the wires 12.

When the power from the source is resumed at the proper values, through the solenoid operated switches and circuits previously described, the flow of current to the magnetic clutch 10 will then be interrupted with the result that the clutch elements will separate breaking that portion of the shaft 9 which extends to the internal combustion engine 7. The electrical circuit to the engine magneto 16 as well as the other circuits will then resume the conditions shown in Fig. 2, wherein the electric motor 6 is in normal operation but the engine 7 is idle. It will be understood that the cut-in and cut-out voltages can be changed to any specified values by conventional screw adjustments of the pilot relay. To further stabilize the output voltage, voltage regulators may be used if desired.

From the foregoing description it will appear that the improved motor and engine driven electric generating assemblage provides an efficient automatic unitary assemblage for providing a constant source of electrical energy to any electrically operated equipment, notwithstanding failures or fluctuations in the electrical power flowing from the normal commercial source. The assemblage is furthermore compact, simple and efficient and is well adapted for the purposes set forth.

What is claimed as the invention is:

1. In combination, an electric motor supplied with electrical energy from a source, an internal combustion engine, a generator to supply electricity to associated equipment, a first shaft drivingly connecting the motor with the generator, a flywheel fast on said shaft, a second shaft having a portion thereof adjacent said first shaft and operatively extending to the engine, a clutch to engage and disengage the adjacent portions of said first and second shafts, and means affected by changes in the electrical power flowing to the motor for operating said clutch.

2. In combination, an electric motor supplied with electrical energy from a source, an internal combustion engine, a generator to supply electricity to associated equipment, a first shaft drivingly connecting the motor with the generator, a flywheel fast on said shaft and revolved by the motor when the latter is in operation, a second shaft having a portion thereof adjacent said first shaft and operatively extending to the engine, a clutch to engage and disengage adjacent portions of said first and second shafts, and means affected by changes in the electrical power flowing to the motor for operating said clutch, engagement of the clutch initially causing the engine to be cranked by the momentum of the flywheel.

3. In combination, an electric motor supplied with electrical energy from a source, an internal combustion engine, a generator to supply electricity to associated equipment, a first shaft drivingly connecting the motor with the generator, a flywheel fast on said shaft, a second shaft having a portion thereof adjacent said first shaft and operatively extending to the engine, an electrically actuated magnetic clutch to engage and disengage the adjacent portions of said first and second shafts, and means affected by an interruption in the electrical power flowing to the motor for engaging said clutch whereby the momentum of the flywheel cranks said engine and causes it to drive the generator through the clutch-engaged first and second shafts.

4. In combination, an electric motor normally supplied with constant electrical energy from a source, an internal combustion engine, a generator to supply electricity to associated equipment, a shaft drivingly connecting the motor with the generator, a flywheel fast on said shaft, a second shaft having a portion thereof adjacent said first shaft and operatively extending to the engine, an electrically actuated clutch to engage and disengage the adjacent portions of said first and second shafts, an electrical circuit including the motor and clutch, and means in said circuit affected by cessations and resumptions of the electrical power flowing to the motor for engaging and disengaging said clutch, the momentum of the flywheel, when the clutch is engaged causing the engine to be cranked to thereafter drive the generator through the engaged first and second shafts, the disengagement of the shafts disconnecting the engine from the generator and motor.

5. In combination, an electric motor supplied with electricity from a source, an internal combustion engine having a magneto, a generator having wires extending therefrom to supply electricity to associated electrical equipment, said generator having a shaft portion extending to the motor to be driven thereby and also extending to the engine, the shaft portion to the engine being split, an electrically operated magnetic clutch interposed between the split shaft portions, a flywheel fast on a portion of the shaft directly extending to the generator and motor and driven by the motor, and solenoid switch controlled circuits including the motor, the engine magneto and the magnetic clutch operative upon a failure in the power to the motor to energize and engage the clutch to join the shaft split portions whereby the engine is cranked through the momentum of the flywheel to thereafter drive the generator from the engine so long as the clutch remains engaged.

6. In combination, an electric motor supplied with electrical energy from a source, an internal combustion engine having a starting mechanism, a generator to supply electricity to associated equipment, a first shaft operatively extended to both the motor and the generator, a second shaft having a portion thereof adjacent said first shaft and operatively extended to the engine, a clutch to engage and disengage the adjacent portions of said first and second shafts, and means operated by a drop in the electrical power flowing to the motor for operating said clutch to join the first and second shafts whereby the engine starting mechanism becomes activated.

7. In combination, an electric motor supplied with electrical energy from a source, an internal combustion engine having a magneto, a generator to supply electricity to associated equipment, a first shaft drivingly connecting the motor with the generator and having an extension portion, a flywheel fast on said shaft extension portion and revolved by the motor when the latter is in operation, a second shaft having a portion thereof adjacent said first shaft extension portion and operatively extending to the engine, an electrically actuated clutch to engage and disengage adjacent portions of said first and second shafts, electrical circuits including the motor, clutch and magneto, and means in said circuits affected by changes in the electrical power flowing to the motor for operating said clutch and magneto, engagement of the clutch initially causing the engine to be cranked through the engaged first and second shafts by the momentum of the flywheel.

8. Stand-by electricity generating equipment, comprising an electric motor supplied with electricity from a source, an internal combustion engine having a magneto, a generator having wires extending therefrom to supply electricity to associated electrical equipment, said generator having a shaft portion extending to the motor to be driven thereby and also extending to the engine, the latter shaft portion being split, an electrically operated magnetic clutch interposed between the split shaft portions, a flywheel fast on a portion of the shaft extending to the generator and motor and driven by the motor, and solenoid switch controlled circuits including the motor, the engine magneto and the magnetic clutch operative upon a failure in the power to the motor to energize and engage the clutch to join the shaft split portions and to activate the engine magneto whereby the engine is cranked through the momentum of the flywheel to thereafter drive the generator from the engine so long as the clutch remains engaged.

9. In combination, an electric motor normally supplied with constant electrical energy from a source, an internal combustion engine having a magneto, a generator having wires extending therefrom to supply electricity upon a failure in the supply from the source to associated equipment, said generator having a shaft extending to the motor to be driven thereby and also extending to the engine, the latter shaft portion being split, an electrically operated magnetic clutch interposed between the split shaft portions, a flywheel fast on a portion of the shaft extending to the generator and motor and driven by the motor when the latter is receiving proper electrical energy from the source, an electrical circuit including the motor and clutch, and means in said circuit affected by cessations and resumptions of the electrical power flowing to the motor for engaging and disengaging said clutch, the momentum of the flywheel, when the clutch is engaged causing the engine to be cranked to thereafter drive the generator through the engaged split portions of the shaft at which time the flywheel is driven by the engine, the disengagement of the shaft split portions disconnecting the generator, motor and flywheel from the engine.

10. Stand-by electricity generating equipment, comprising an electric motor normally supplied with electricity from a source, an internal combustion engine having a magneto, a generator engine and having wires extending to associated electrical equipment which is to be constantly supplied with electricity, said generator having a shaft portion extending to the motor to be driven thereby when the motor is in operation and also extending to the engine, the latter shaft portion being split, an electrically operated magnetic clutch interposed between the split shaft portions, a flywheel fast on a portion of the shaft directly extending to the generator and motor and constantly driven either by the motor or engine, and solenoid switch controlled circuits including the motor, the engine magneto and the magnetic clutch operative upon a failure in the power to the motor to energize and engage the clutch to join the shaft split portions and to activate the engine magneto whereby the engine is initially cranked through the momentum of the flywheel to thereafter drive the generator from the engine so long as the clutch remains engaged, the clutch being disengaged through said switch controlled circuits when there is a resumption in the proper supply of electricity to the motor from the source.

11. In combination, an electric motor supplied with electrical energy from a source, an engine, a generator to supply electricity to associated equipment, a motor and generator shaft, a flywheel fast on said shaft, an engine shaft, portions of the motor and generator shaft and engine shaft being in adjacency, a clutch to connect and disconnect the adjacent portions of said shafts, means for operating said clutch, and means affected by changes in the electrical power flowing to the motor for controlling said clutch operating means.

References Cited in the file of this patent

UNITED STATES PATENTS

| Number | Name | Date |
|---|---|---|
| 996,334 | Haskins | June 27, 1911 |
| 1,187,795 | Treffin | June 20, 1916 |
| 1,703,064 | Griffiths | Feb. 19, 1929 |
| 1,713,649 | Fletcher | May 21, 1929 |
| 1,998,665 | Bryan | Apr. 23, 1935 |
| 2,302,192 | Dannheiser | Nov. 17, 1942 |
| 2,376,421 | Drake | May 22, 1945 |
| 2,427,678 | Laging | Sept. 23, 1947 |
| 2,476,086 | Dorey | July 12, 1949 |

FOREIGN PATENTS

| Number | Country | Date |
|---|---|---|
| 711,375 | France | June 23, 1931 |